United States Patent [19]

Herman et al.

[11] 4,411,755
[45] * Oct. 25, 1983

[54] LASER-ASSISTED ISOTOPE SEPARATION OF TRITIUM

[75] Inventors: Irving P. Herman, Castro Valley; Jack B. Marling, Livermore, both of Calif.

[73] Assignee: The United States of America as represented by the U.S. Department of Energy, Washington, D.C.

[*] Notice: The portion of the term of this patent subsequent to Mar. 24, 1998, has been disclaimed.

[21] Appl. No.: 210,716

[22] Filed: Nov. 28, 1980

[51] Int. Cl.$^3$ .............................................. B01D 59/00
[52] U.S. Cl. ............................ 204/163 R; 204/158 R; 204/157.1 R
[58] Field of Search ........................... 204/158 R, 163

[56] References Cited

U.S. PATENT DOCUMENTS

| 3,443,087 | 5/1969 | Robieux et al. | |
|---|---|---|---|
| 3,904,500 | 9/1975 | Jensen | |
| 4,003,809 | 1/1977 | Lyon | |
| 4,025,787 | 5/1977 | Janner | |
| 4,049,515 | 9/1977 | Robinson | |
| 4,081,339 | 3/1978 | Benson | 204/158 R |
| 4,257,860 | 3/1981 | Marling et al. | 204/162 R |

FOREIGN PATENT DOCUMENTS 2312194  3/1973  Fed. Rep. of Germany .

OTHER PUBLICATIONS

Ishikawa et al. "Calculation of Fundamental Vibration Frequencies..." *J. Nucl. Sci. Tech.* 17(4), pp. 275-280, Apr. 1980.
Makide et al., "Tritium Separation..." *J. Nucl. Sci. Tech.* 17(8), pp. 645-648, Aug. 1980.
Jensen et al., "Laser-Induced Recovery of Deuterium . . ." 2° *Euro. Electro-Optics Conf.* Montreaux, Switz., Apr. 1974, p. 106.
Barr et al., "The Future for Cheap Heavy Water" *Chem. Engr. Prog.* 56(3), 49-56, (Mar. 1960).
Tiffany et al., *Science* 157, 40-43, (July 1967).
Tiffany, *J. Chem. Phys.* 48, 3019-3031, (1969).
Mayer et al., *Appl. Phys. Lett.* 17 516-519, (1970).
Yeung et al., *Appl. Physl Lett.* 21 109-110, (1972).
Ambartzumian et al., *JETP Lett.* 17 63-65, (1973).
Ambartzumian et al., *IEEE J. Quant. Elec.* QE-7 305, (1971).
Ambartzumian et al., *Appl. Optics,* 11 354 (1972).
Ambartzumian et al., *Chem. Phys. Lett.* 13 446 (1972).
Lin, ORNL-TM-3976, (Dec. 1972).
Herman et al., *Chem. Phys. Lett.,* 64 75 (1979).
Herman et al., *J. Chem. Phys.* 72 516 (1980).
Marling et al., *J. Chem. Phys.* 72 5603, (1980).

*Primary Examiner*—Deborah L. Kyle
*Attorney, Agent, or Firm*—John F. Schipper; Patrick T. King; Richard G. Besha

[57] ABSTRACT

Methods for laser-assisted isotope separation of tritium, using infrared multiple photon dissociation of tritium-bearing products in the gas phase. One such process involves the steps of (1) catalytic exchange of a deuterium-bearing molecule XYD with tritiated water DTO from sources such as a heavy water fission reactor, to produce the tritium-bearing working molecules XYT and (2) photoselective dissociation of XYT to form a tritium-rich product. By an analogous procedure, tritium is separated from tritium-bearing materials that contain predominately hydrogen such as a light water coolant from fission or fusion reactors.

23 Claims, 2 Drawing Figures

LASER-ASSISTED ISOTOPE SEPARATION OF TRITIUM

The U.S. Government has rights in this invention pursuant to Contract No. W-7405-ENG-48 between the U.S. Department of Energy and the University of California Lawrence Livermore Laboratory.

FIELD OF THE INVENTION

This invention relates to the laser-assisted chemical separation of molecules containing the tritium isotope of hydrogen.

BACKGROUND OF THE INVENTION

Both light water and heavy water reactors produce tritium waste, although more tritium is produced in heavy water reactors by reactions such as $D(n,\gamma)T$ in the coolant-moderator $D_2O$, where tritium concentrations of 6 ppm T:D are common. Tritium concentration in the $H_2O$ coolant in light water reactors is usually lower by a factor of $10^3$–$10^4$ than the tritium concentration in heavy water. It is of interest to extract the tritium in an enriched form, both because of the value of enriched tritiated fluids and because of the difficulty of disposal of radioactive, tritium-rich products having a tritium half life of 12.3 years. Twenty years ago, Barr and Drews in "The Future for Cheap Heavy Water", *Chemical Engineering Progress* 56 (3) 49–56 (March 1960), reported on 98 known processes that promote the separation of the hydrogen isotropes (H, D, T). But not one of these processes is able to economically extract triitium from the process waters of nuclear facilities.

Since 1961, when lasers as substantially monochromatic light sources became available, interest has grown in the use of laser radiation to photoselectively promote chemical reactions. Tiffany, Moos and Schawlow, in *Science*, 157, 40–43 (July 7, 1967), reported on the use of tunable ruby laser radiation ($\lambda = 6934$–$6943$ Å) to photoselectively promote gas phase reactions between $Br_2$ molecules containing particular isotopes ($^{79}Br$ and $^{81}Br$). This may have been the first evidence of photochemical reactions in materials such as bromine in which excited molecules rather than atoms are formed in the primary process. However, when certain isotopes of bromine were photoselectively excited, no net isotopic enrichment was detected in the reaction products, possibly due to isotopic scrambling. This work is discussed further by Tiffany in "Selective Photochemistry of Bromine Using a Ruby Laser", *Journal of Chemical Physics*, Vol. 48, 3019–3031 (1968).

Robieux and Auclair, in U.S. Pat. No. 3,443,087 (issued May 6, 1969), disclose and claim the use of a narrow bandwidth laser to photoselectively raise an isotope of a given chemical element to an excited state while leaving other isotopes of the chemical element generally undisturbed. The interest of the Robieux et al invention centers on photoselective ionization of the chosen isotope by a two-step laser irradiation process applied to atoms of the selected chemical element.

Nebenzahl and Levin, in German Pat. No. 2,312,194 (issued Mar. 12, 1973), also disclose the use of a two-step laser radiation process to photoselectively ionize atoms or molecules containing a particular isotope such as $^{235}U$. Charge exchange of the ionized isotopes is one of the problems that must be dealt with here.

Mayer, Qwok, Gross and Spencer, in "Isotope Separation with the CW Hydrogen Fluoride Laser", *Applied Physics Letters*, Vol. 17, 516–519 (1970), discuss the use of a hydrogen fluoride laser ($\lambda = 2.64$–$2.87$ $\mu$m) to separate deuterium isotopes from hydrogen by photoselective reaction of methanol ($H_3COH$) with bromine molecules to form HBr and formaldehyde ($H_2CO$). In one approach, methanol with one or more hydrogen atoms replaced by deuterium is caused to preferentially react with bromine by absorption of narrow band laser radiation.

Yeung and Moore, in "Isotope Separation by Photopredissociation", *Applied Physics Letters*, Vol. 21, 109–110 (1972), discuss photoselective predissociation of $H_2CO$ to form the products $H_2$ and CO having a high abundance of preselected isotope-containing molecules such as $^{13}C$, $^{14}C$, and $^{18}O$. Yeung et al also suggested the use of substituted formaldehydes such as $Cl_2CO$ and $Cl_2CS$, for which spectroscopic and photochemical information was not yet available.

Gould, in "Economic Aspects of Tritium Separation from Water via Laser Isotope Separation", thesis for the degree of Nuclear Engineer, M.I.T., February 1978 (unpublished), discusses the possible use of photoselective predissociation of formaldehyde for tritium-from-hydrogen separation.

Jensen and Lyman, in "Laser Induced Recovery of Deuterium or Tritium from Water", Second European Electro-Optics Conference, Montreaux, Switzerland, April 1974, disclosed the use of a two-step selective photolytic process to selectively remove HDO and $D_2O$ from water, using the coincidence of certain DF laser lines with absorption lines for the desired isotopic molecules. CO is added to the photolysis mixture to remove the O atom from the OH photolysis product, and the desired isotopic material is collected as $D_2$. Along similar lines, Ambartzumian, Letokhov, et al, in *J.E.T.P. Letters* 17, 63–65 (1973), used a two-step laser selective photolysis, discussed infra, of the $NH_3$ molecule to separate the isotopes $^{14}N$ and $^{15}N$.

Ambartzumian and Letokhov, in I.E.E.E. Journal of Quantum Electronics, QE-7, 305 (1971), Applied Optics, 11, 354 (1972) and Chem. Phys. Lett., 13, 446 (1972), have reported use of a selective two-step photodissociation process (STP) that uses two simultaneously applied light sources for isotope separation. The first light source, a narrowband infrared laser, selectively excites a predetermined molecular vibration to increase the ultraviolet absorption rate, and the second light source is a continuum ultraviolet source that enhances dissociation of the vibrationally excited molecules.

K. H. Lin, in "Tritium Enrichment by Isotope Separation Technique", Oak Ridge National Laboratory Report ORNL-TM-3976 (December 1972), discusses seven techniques for removal of tritium from an isotope mixture containing $H_2O$, HDO, HTO, DTO, $D_2O$ and $T_2O$; using only thermomechanical, mechanical and/or chemical techniques. No laser-assisted techniques are considered.

Kersher and Wadt, in "Laser Isotope Separation: Water Detritiation", Monsanto Research Corp. Mound Laboratory Memo, circa 1975, discuss the possibility of decontamination of tritiated water wastes, using isotope selective vibrational excitation of HTO (but not of $H_2O$) to increase the reaction rate of HTO vis-a-vis $H_2O$. However, the overall reaction rate of HTO is still quite low as the vibrational energy increase represents only 7–14% of the activation energy for reactions of interest. Therefore, Kersher et al choose the selective two-step photodissociation (STP) process of Ambartzumian and Letokov, supra, applied to the O-T stretch of $v'=2,295$ cm$^{-1}$ ($\lambda=4.36$ μm). The photoselective vibrational excitation is provided by a tunable optical parametric oscillator, pumped by a pulsed Nd:YAG laser at $\lambda=1.06$ μm. This is followed by application of an intense (~$2.5\times10^5$ watts/cm$^2$), pulsed ultraviolet source at $\lambda=1,890$ Å (which may be a continuum source) and by provision of a suitable tritium scavenger such as H or $H_2$. The reactions proceed according to $HTO+hv_1$ (2,295 cm$^{-1}$)$+hv_2$ (52,910 cm$^{-1}$)$\rightarrow OH+T$ and $H+T\rightarrow HT$. These experimental efforts to separate tritium were unsuccessful.

U.S. Pat. No. 4,049,515 to C. P. Robinson et al (issued Sept. 20, 1977) discloses and claims the use of isotope-selective multiphoton absorption of intense, monochromatic light from an infrared laser, such as a $CO_2$ laser, by a molecular species having a high density of vibrational levels. The molecules containing the predetermined isotope each absorb multiple laser photons and are vibrationally excited to the point that such molecules either dissociate or preferentially chemically react with other molecules to produce dissociation products or reaction products that are isotopically enriched and are easily separated. Robinson et al note that the isotope-containing species is preferably a polyatomic molecule containing four or more atoms, in part to insure a sufficient density of vibrational states.

Benson, in U.S. Pat. No. 4,081,339, teaches the use of organic target molecules of the form RX, with R selected from the ethyl, isopropyl, t-butyl or cyclopentenyl groups and X selected from a functional group including F, Cl, Br, OH (and OD) and H (and D), the molecules being irradiated by a single pulsed infrared laser or by two weaker lasers tuned to photoselectively dissociate the reactant molecules RX containing deuterium in place of one or more H atoms. The dissociation products may be of the form $C_nH_{2n-1}D+HX$ and are stable molecules rather than reactive radicals. This process may be of limited utility because of low optical selectivity and severe collisional quenching.

Infrared photolysis of $CDF_3$, with applications to deuterium separation, has been discussed by Herman and Marling in Chemical Physics Letters, Vol. 64, 75-80 (1979), with $CO_2$ laser multiple photon dissociation being the moving force. In Jour. of Chemical Physics 72 516 (1980), Herman and Marling show that deuterated fluoroform, $CDF_3$, exhibits strong, selective absorption peaks at $\lambda=10.21$ and 10.31 μm and allows single-step isotopic optical selectivity factors greater than 10,000 at modest pressures. Marling, Herman and Thomas, in Jour. of Chemical Physics 72 5603 (1980) have shown that this process is efficient at pressures of several hundred torr, if one shortens the infrared laser pulse duration to $\Delta t \lesssim 2$ nsec.

These three reports form the basis of U.S. patent application Ser. No. 943,833 (patent allowed circa July 1980) by Marling and Herman, which discloses and claims the use of intense monochromatic radiation from a pulsed infrared laser, such as the $CO_2$ laser, to enrich deuterium by selectively dissociating multihalogenated organic compounds such as $CDF_3$. The cited patent also discloses and claims the use of shortened laser pulse durations (to a few nanoseconds) to permit operation at pressures above 100 torr. Deuterium is replenished in the multihalogenated working molecule by exchange with a deuterium-rich feedstream such as naturally occuring water.

Ishikawa, Arai and Nakane, in Jour. of Nuclear Sci. and Tech. 17 (April 1980) 275, have calculated some fundamental vibration frequencies of twelve halomethanes with tritium substituted at one site for hydrogen ($CTF_3$, $CTCl_3$, $CTBr_3$, $CTHF_2$, $CTHCl_2$, $CTHBr_2$, $CTF_2Cl$, $CTCl_2F$, $CTF_2Br$, $CTBr_2F$, $CTCl_2Br$ and $CTBr_2Cl$). These authors use the Wilson FG matrix method, the Urey-Bradley type force and interaction constants of Plyler and Benedict for non-tritium-substituted halomethanes. The authors also assume that substitution of deuterium or tritium for hydrogen would not alter the constants or interatomic distances, and use, as interaction constants for mixed molecules containing more than one species of halogen, the geometric mean of the interaction constants for corresponding molecules containing only one halogen specie. Inherent approximations in this method can produce substantial discrepancies in the frequencies computed. For example, $CTF_3$ frequencies observed by the applicants herein agree generally with the applicants' own frequency calculations, but differ substantially (by ~60 cm$^{-1}$) with the calculated frequencies of Ishikawa et al. This difference is quite important as the applicants' own calculations, but not those of Ishikawa et al, indicate that laser-assisted isotope separation using $CTCl_3$ is feasible using a wavelength available from $NH_3$ laser emission.

Makide et al, in Jour. of Nuclear Sci. and Tech. 17 (August 1980) 645, apply the fundamental frequencies calculated above by Ishikawa et al to multiphoton dissociation of tritium-substituted trifluoromethane, using a $CO_2$ laser tuned to $\lambda=9.6$ μm with a long (100 nsec) pulse duration to separate tritium from hydrogen through reactions such as

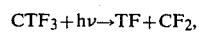

$CTF_3+hv\rightarrow TF+CF_2,$

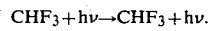

$CHF_3+hv\rightarrow CHF_3+hv.$

The observed tritium low enrichment factors (near 10) were low due to their use of a 10 times higher than necessary laser fluence; optimum results occurred for the R(14), 1075 cm$^{-1}$ $CO_2$ laser line, in agreement with earlier calculations and predictions of the applicants herein.

SUMMARY OF THE INVENTION

The subject invention provides methods for laser-assisted isotope separation of tritium-bearing molecules from similar hydrogen- and deuterium-bearing molecules in the gas phase, using a combination of chemical reactions for tritium replenishment and photoselective dissociation of the tritiated reaction product.

One object of the invention is to provide methods for obtaining tritium-rich product from low concentration tritium sources such as coolant in light water and heavy water reactors.

Additional objects, novelties and advantages of the invention are set forth in the detailed description and should become apparent to those skilled in the art upon examination of the following. The objects and advantages of the invention may be realized by means of the instrumentalities and combinations recited in the appended claims.

To achieve the foregoing objects of the invention, as embodied and broadly described herein, the method may comprise the steps of providing an initial fluid containing an isotope mixture of $D_2O$ and DTO; catalytically reacting the initial fluid with deuterium-containing working molecules XYD in an exchange reaction to produce XYT; irradiating the molecules XYT and XYD with a laser that photoselectively dissociates the molecules XYT to X+YT; and chemically separating the molecules YT from the remainder.

A second method to achieve the foregoing objects may comprise the steps of providing an initial fluid containing an isotopic mixture of $H_2O$ and HTO; catalytically reacting the working fluid with hydrogen-containing working molecules XYH in an exchange reaction to produce XYT; irradiating the molecules XYT and XYH with a laser that photoselectively dissociates the molecules XYT to X+YT; and chemically separating the molecules YT from the remainder.

BRIEF DESCRIPTION OF THE DRAWINGS

The accompanying drawings, which are incorporated in and form a part of the specification, illustrate one embodiment of the subject invention.

DETAILED DESCRIPTION

Figure 1:
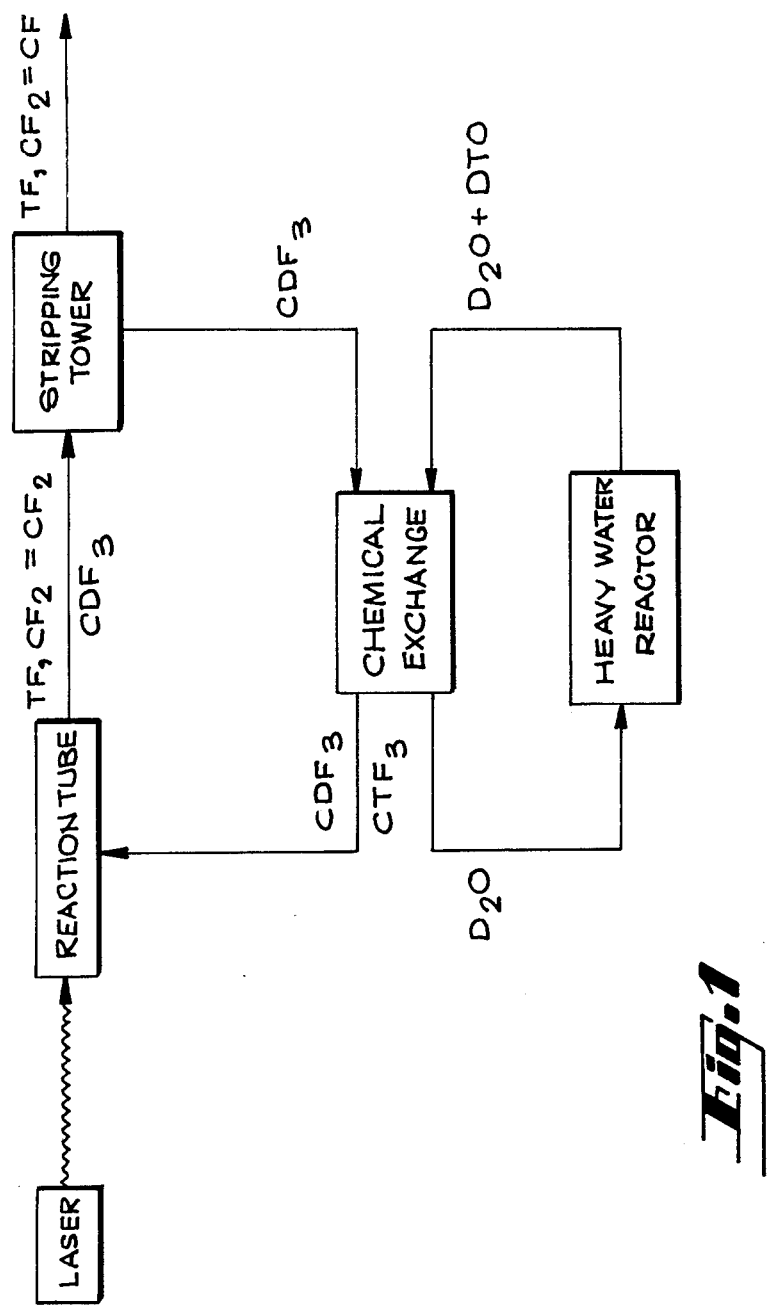
FIG. 1 is a schematic view of a representative process for recharging the working molecules with tritium from a heavy water reactor, for use in a process involving T/D separation.
Figure 2:
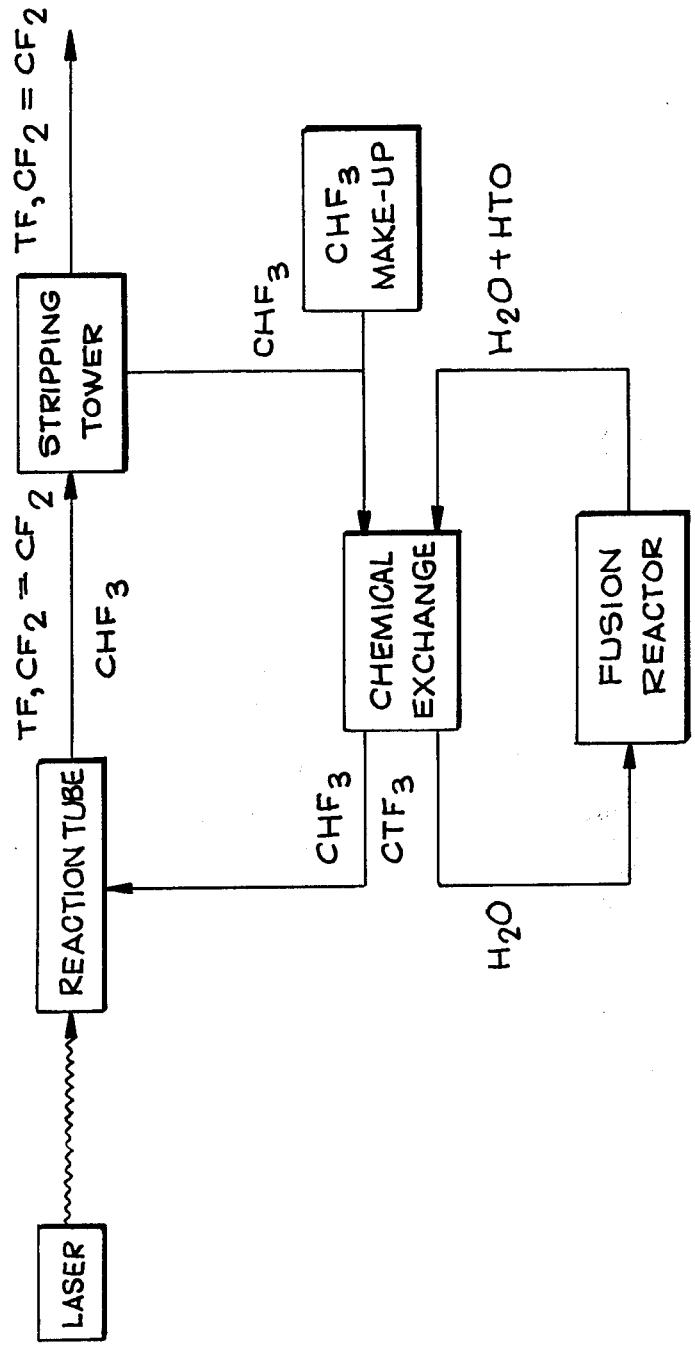
FIG. 2 is a schematic view of a representative process for recharging the working molecules with tritium from a fusion reactor, for use in a process involving T/H separation.

Light water and heavy water reactors inter alia are sources of tritium waste, produced by reactions such as $D(n,\gamma)T$ in the presence of substantial amounts of $D_2O$. It is of interest to extract the tritium in an enriched form, because of the difficulty of storage and disposal of radioactive, tritium-rich products, and because of the value of enriched tritiated fluids. In heavy water reactors, using the coolant-moderator $D_2O$, tritium concentrations of 20 Ci/liter or 6 ppm T:D are common; in pressurized water reactors, the tritium concentration is $10^{-3}$–$10^{-2}$ Ci/liter; and in light water reactors, $10^{-6}$–$10^{-4}$ Ci/liter tritium concentrations are normal. Further, tritium contamination of coolant water ($H_2O$ or $D_2O$) will be a serious problem in fusion reactors. Tritium has a half life of 12.3 years so that it must be stored for several decades in any waste disposal program. Clearly, then, concentration of the tritium in a highly enriched form is an attractive approach to tritium storage and disposal.

The subject invention provides a method for tritium separation or enrichment from heavy water or from light water, using catalytically induced deuterium-tritium exchange in a working molecule, followed by photoselective dissociation of the working molecule in the gas phase. One begins with a mixture of $D_2O$ (or $H_2O$) and a small concentration of DTO (or HTO), in liquid or gas form, with molecules of an appropriate exchange molecule XYD and catalytically induces exchange by a reaction such as

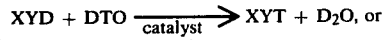
XYD + DTO $\xrightarrow{\text{catalyst}}$ XYT + $D_2O$, or

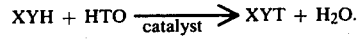
XYH + HTO $\xrightarrow{\text{catalyst}}$ XYT + $H_2O$.

XYD (or XYH) is a small molecule such as $CZ_3D$ with Z being a halogen. The gas phase tritiated working molecules XYT are then passed through a laser reactor which, in one approach, uses a pulsed infrared laser oscillating at a wavelength that is selectively absorbed by the tritiated species XYT and is substantially transparent to the deuterated species XYD (or XYH). The dissociation reactions then proceed according to

XYT + nhν → X + YT,

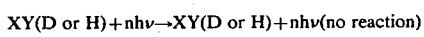
XY(D or H) + nhν → XY(D or H) + nhν (no reaction)

where n is a large number $\geq 20$.

Finally, of course, the working molecule must have a suitable absorption spectrum and must easily undergo hydrogen or deuterium exchange with water, possibly with the aid of a catalyst and possibly at temperatures differing from ambient temperature.

One possible choice here is $CO_2$ laser photolysis of the working molecule XYT in a wavelength region (9–11 μm) for T/D separation where XYD, and preferably also XYH, are transparent; and XYH is transparent for T/H separation. The infrared spectra of only a few polyatomic, tritiated molecules (such as $H_2O$, $CH_4$, etc.) are known; none of these is a good candidate here. For example, $CD_3T$ has branch peaks at 990 cm$^{-1}$, 1066 cm$^{-1}$ and 929 cm$^{-1}$. However, the rotational spetra of the $\nu_2$ mode at 1092 cm$^{-1}$ and the $\nu_4$ mode at 997 cm$^{-1}$ of $CD_4$ effectively overlap the $CD_3T$ spectrum so that methane is apparently not useful here.

One attractive, previously uninvestigated candidate is trifluoromethane, for which the $CDF_3$ species is transparent from 10.5–12.5 μm while $CTF_3$ absorption occurs near 12.0 μm. $CTF_3$ also has strong, isotopically selective absorption near 9.3 μm, which is easily accessible by a $CO_2$ laser. Since $CHF_3$ is transparent near λ=9.3 μm, the system ($CHF_3$, $CTF_3$) is very attractive for separation of T from H, possibly with $^{13}CHF_3$ stripped away. Additionally, trifluoromethane is attractive for T/D separation at λ=9.4 μm, preferably utilizing $CDF_3$ stripped of $^{13}C$; $^{12}CDF_3$, but not $^{13}CDF_3$, is substantially transparent near λ=9.4 μm, where $CTF_3$ has strong absorption.

An alternative scheme uses CO-laser induced multiple photon dissociation; the C-T stretching mode of most molecules is around 1900 cm$^{-1}$, which may be reached by CO laser radiation. Another possibility is two-color or two-frequency operation, such as single photon absorption from a CO laser, followed by $CO_2$ laser multiple photon absorption and dissociation, or using two different $CO_2$ laser wavelengths with multiphoton absorption and dissociation, or using an $NH_3$ laser and a $CO_2$ laser for multiple photon absorption and dissociation.

We have used a computer program to evaluate the fundamental frequencies of the tritiated trihalomethanes, with most calculations probably being accurate to within a few cm$^{-1}$. The results of these calculations are presented in Table I ($CTF_3$), Table II ($CTCl_3$), and Table III ($CTBr_3$), together with the experimentally observed values for the respective hydrogenated and deuterated molecule spectra. Recent synthesis of $CTF_3$ has yielded the fundamental infrared absorption frequencies shown in Table IV. Tables I-IV appear as attachments.

One of the most promising systems for tritium recovery from $D_2O$ is excitation of the $\nu_4$ mode of $^{12}CTCl_3$ with an $NH_3$ laser oscillating near λ=12.08 μm. The corresponding deuterated molecule, $CDCl_3$, is weakly absorbing at this wavelength so that the T/D optical selectivity of the tritiated species may be greater than 1000 here. The $NH_3$ laser can be made to oscillate near 12.08 μm by efficient pumping of $NH_3$ by the $CO_2$ laser near $\lambda = 9.22$ μm, with an overall electrical efficiency greater than 1%. Since chloroform ($CDCl_3$) undergoes rapid aqueous phase T-D exchange, this system is an attractive one.

From Table I, one notes that the $\nu_2$ mode of $CTF_3$ is red-shifted about 35 cm$^{-1}$ in $^{12}CTF_3$ relative to $CDF_3$ and that the $\nu_2$ mode is resonant with the $CO_2$ laser; but unless the medium is cooled sufficiently, the system is not as attractive for T/D separation than the $CTCl_3/NH_3$ laser combination, due to substantial absorption in the $CDF_3$ wing of the undesired molecule. Further, the $^{13}CDF_3\nu_2$ band, located at 1008 cm$^{-1}$, will substantially decrease the T/D optical selectivity if this molecule is present so that the 1.1% of $^{13}C$-containing fluoroform would first have to be burned out completely. However, since infrared multiple photon dissociation commonly occurs with an increased dissociation yield for irradiation at wavelengths slightly red-shifted from a strong mode, irradiation at frequencies somewhat lower than the $\nu_2$ mode, but resonant with the laser, may also be suitable for T/D recovery. T/D separation is also feasible by multiple photon dissociation of the $\nu_5$ mode in $CTF_3$ near $\lambda = 12.0$ μm; but the $CTCl_3$ system is more attractive because of the greater relative ease of tritium isotope exchange in chloroform as compared to fluoroform.

The most promising system for T/H separation and/or tritium recovery utilizes the $\nu_2$ mode of $CTF_3$, which absorbs near $\lambda = 9.3$ μm. This wavelength is accessible by a $CO_2$ laser, and $CHF_3$ is highly transparent in this spectral region, allowing high optical selectivity in absorption and in subsequent dissociation. Tritium is recovered as TF, and tritium replenishment occurs by aqueous exchange catalyzed by added base. Burning out the 1.1% of $^{13}C$-containing trifluoromethane may improve system performance.

Tritium-hydrogen recovery using the $\nu_5$ mode of $CTF_3$ near $\lambda = 12.0$ μm is hampered by the appearance of a weak $\nu_4-\nu_6$ hot band in that region; and T/H separation using the $\nu_4$ mode of $CTCl_3$ at $\lambda = 12.0$ μm is not very attractive because of the presence of a $\nu_4-\nu_3$ hot band in the working molecule. Irradiation near $\lambda = 9.3$ μm in $CTF_3/CHF_3$ is preferable to irradiation near $\lambda = 12.0$ μm in $CTF_3$ or $CTCl_3$ for T/H recovery.

Similar preliminary calculations of the fundamental frequencies of the dihalomethanes ($CTDF_2$, $CTDCl_2$ and $CTDBr_2$) have been carried out. Difluoromethane appears to be of limited usefulness here; but dichloromethane ($CDTCl_2$) appears to have strong resonances in the wavelength region $\lambda = 10.6-10.9$ μm, which is ideal for T/D recovery using a $CO_2$ laser. $CD_2Cl_2$ is highly transparent in the region $\lambda = 10.8-10.9$ μm so that high T/D isotopic selectivity is expected.

Operation at high working molecule pressures (> 100 torr) is readily achieved by shortening the pulse duration of the laser used to 1-30 nanoseconds. For example, high isotopic selectivity and near unity yields are achieved for trifluoromethane dissociation at partial pressures up to 0.5 atmosphere, using a laser pulse duration of 2 nanoseconds, as shown by Marling et al in Jour. of Chem. Physics 72 5603 (1980) and in related unpublished work. Total operating pressure may be increased to 1 atmosphere by adding an inert buffer gas. Addition of an inert buffer gas to the working molecule increases the absorption coefficient and dissociation probability for some molecules containing the desired isotope. Addition of a scavenger gas may aid tritium recovery by affecting the chemical steps after photolysis. High pressure operation is preferred as the reactor size is smaller and gas pumping costs are lower.

Irradiation at wavelengths somewhat red-shifted from the fundamental absorption modes often leads to improved infrared multiphoton dissociation and therefore may be preferred here.

Although the preferred embodiments of the invention have been described and illustrated herein, the embodiments disclosed are not intended to be exhaustive or to limit the invention; and modifications and variations may be made without departing from the scope of the invention.

TABLE I

FUNDAMENTAL FREQUENCIES IN TRIFLUOROMETHANE[a]

| | $^{12}CH_3^{(b)}$(obs) | $^{12}CDF_3^{(b)}$(obs) | $^{12}CTF_3$(calc.) | | | |
|---|---|---|---|---|---|---|
| | | | KW[b] | D[c] | RBB-12[d] | RBB-11[d] |
| $\nu_1$ | 3035.4 | 2261.1 | 1903.5 (1940.4) | 1941.4 | 1948.7 | 1946.4 |
| $\nu_2$ | 1141.3 | 1111.2 | 1077.4 (1088.8) | 1072.5 | 1067.7 | 1059.2 |
| $\nu_3$ | 700.0 | 694.2 | 688.6 (698.8) | 683.0 | 687.2 | 692.2 |
| $\nu_4$ | 1377.7 | 1210.6 | 1200.2 (1227.0) | 1193.9 | 1204.1 | 1203.6 |
| $\nu_5$ | 1157.5 | 975.5 | 831.1 (842.3) | 832.2 | 831.8 | 832.8 |
| $\nu_6$ | 507.8 | 502.7 | 497.6 (508.2) | 496.3 | 497.1 | 496.2 |

[a] Frequencies are in cm$^{-1}$. $^{12}CHF_3$ and $^{12}CDF_3$ are observed values, while for $^{12}CTF_3$ they are calculated from the respective force fields.
For KW data, numbers in parentheses represent the calculated harmonic frequencies.
In trifluoromethane, the $\nu_4$ and $\nu_5$ modes in $CHF_3$ correspond to the $\nu_5$ and $\nu_4$ modes, respectively, in $CDF_3$ and $CTF_3$.
$\nu_1$, $\nu_2$ and $\nu_3$ are of $A_1$ symmetry; whereas $\nu_4$, $\nu_5$ and $\nu_6$ are doubly degenerate and of E symmetry ($C_{3v}$ group).
[b] R. W. Kirk and P. M. Wilt, J. Mol. Spectrosc. 58, 102 (1975).
[c] R. D'Cunha, J. Mol. Spectrosc. 43, 282 (1972).
[d] A. Ruoff, H. Burger and S. Biedermann, Spectrochim. Acta 27A, 1377 (1971).

TABLE II

FUNDAMENTAL FREQUENCIES IN TRICHLOROMETHANE[a]

| | $^{12}CHCl_3^{(b)}$(obs) | $^{12}CDCl_3^{(c)}$(obs) | $^{12}CTCl_3$(calc.) | | |
|---|---|---|---|---|---|
| | | | BEO[d] | SM[b] | RB[c] |
| $\nu_1$ | 3033.1 [0.0] | 2264.8 [0.0] | (2000.9 [0.1]) | 1898.0 [0.0] | 1931.9 [0.1] |
| $\nu_2$ | 675.5 [5.0] | 657.6 [5.3] | (640.5 [5.2]) | 637.8 [5.6] | 632.7 [5.8] |
| $\nu_3$ | 366.8 [8.4] | 364.2 [8.3] | (365.1 [8.3]) | 361.6 [8.0] | 361.4 [7.8] |
| $\nu_4$ | 1219.7 [0.2] | 914.5 [0.4] | (847.2 [1.0]) | 840.7 [1.4] | 837.1 [1.6] |

TABLE II-continued

FUNDAMENTAL FREQUENCIES IN TRICHLOROMETHANE[a]

| | $^{12}CHCl_3^{(b)}$(obs) | $^{12}CDCl_3^{(c)}$(obs) | $^{12}CTCl_3$(calc.) | | |
|---|---|---|---|---|---|
| | | | BEO[d] | SM[b] | RB[c] |
| $v_5$ | 773.7 [3.8] | 747 [3.9] | (692.8 [4.1]) | 666.1 [3.1] | 673.0 [2.7] |
| $v_6$ | 259.9 [6.8] | 258.8 [6.8] | (259.4 [6.6]) | 259.0 [6.8] | 259.3 [6.9] |

[a]Energies listed are for [ ]$^{35}Cl_3$ from observed spectra in Refs. b and c. In brackets are [ ]$^{35}Cl_3$-[ ]$^{37}Cl_3$ differences. For CHCl$_3$ and CDCl$_3$ these are from Ref. b, which were calculated, All energies are in cm$^{-1}$. The BEO calculated frequencies in column 3 are harmonic frequencies.
[b]K. H. Schmidt and A. Miller, J. Mol. Spectrosc. 50, 115 (1974).
[c]A. Ruoff and H. Burger, Spectrochim. Acta 26A, 989 (1970).
[d]D. Bermejo, R. Escribano and J. M. Orza, J. Raman Spectrosc. 6, 151 (1972).

TABLE III

FUNDAMENTAL FREQUENCIES IN TRIBROMOMETHANE[a]

| | $^{12}CHBr_3^{(7)}$(obs)[b] | $^{12}CDBr_3^{(7)}$(obs)[b] | $^{12}CT^{79}Br_3$(calc) | $^{12}CT^{81}Br_3$(calc) |
|---|---|---|---|---|
| $v_1$ | 3049.8 | 2272.5 | 1929.2 | 1929.2 |
| $v_2$ | 542.6 | 524.1 | 506.1 | 505.0 |
| $v_3$ | 223.2 | 223.2 | 222.8 | 220.4 |
| $v_4$ | 668.8 | 645.2 | 594.0 | 593.3 |
| $v_5$ | 155.4 | 155.1 | 156.0 | 154.2 |
| $v_6$ | 1148.6 | 860.3 | 761.5 | 761.3 |

[a]Energies are in cm$^{-1}$. Experimental data and general harmonic force fields are from H. Burger and J. Cichon, Spectrochim. Acta 27A, 2191 (1971).
[b]Average of [ ]$^{79}Br_3$ and [ ]$^{81}Br_3$ frequencies.

TABLE IV

Observed CTF$_3$ Vibrational Frequencies

| | Observed Spectral Peak (cm$^{-1}$) | Estimated Fundamental Band Center (cm$^{-1}$) | Estimated Harmonic Frequency[b] (cm$^{-1}$) |
|---|---|---|---|
| $v_1$ | 1930.3 | 1930.5 | 1967.4 |
| $v_2$ | 1097.5 P | 1077.4 | 1088.8 |
| | 1076.9 Q | | |
| | 1061.0 R | | |
| $v_3$ | 687.0 | 687.1 | 697.3 |
| $v_4$ | 1199.8 | 1200.0 | 1226.6[c] |
| $v_5$ | 845.5 "p" | 837.6 | 849.1[c] |
| | 837.9 Valley | | |
| | 830.9 "R" | | |
| $v_6$ | 496.0[a] | 496.0[a] | 506.6[a] |

[a]$v_6$ estimated band center, determined by shifts from CHF$_3$ and CDF$_3$ spectra. (N. J. Fyke, P. Lockett, J. K. Thompson and P. M. Wilt, J. Mol. Spectrosc. 58, 87 (1975).
[b]Estimated using isotope-shifted anharmonicity constants (see text) and the estimated band center frequency.
[c]Observed frequency of $v_4$, Q-branch peak, or $v_5$, central valley, used to estimate harmonic frequency.

We claim:

1. A method for isotope separation of tritium-bearing molecules from heavy water reactor coolants in a molecular mixture, the method comprising the steps of:
    providing an initial fluid containing an isotope mixture of deuterium-containing molecules D$_2$O and tritium-containing molecules DTO;
    catalytically reacting the initial fluid with deuterium-containing working molecules XYD, where the working molecule XYD is a doubly-halogenated or triply halogenated methane molecule, in an exchange reaction DTO+XYD→D$_2$O+XYT to obtain product molecules XYT;
    irradiating the product molecules XYT and the working molecules XYD with a pulsed infrared laser, tuned to a frequency that is photoselectively absorbed by XYT but not by XYD, so that the XYT molecules absorb a large number n($\geq$20) of laser photons of frequency $v$ and dissociate according to the reaction XYT+nh$v$→X+YT; and
    chemically separating the molecules YT from the other molecules in the molecular mixture.

2. A method according to claim 1, further including the step of providing a CO$_2$ laser for irradiating the molecules XYT and XYD.

3. A method according to claim 2, further including the steps of providing CD$_2$Cl$_2$ as the working molecule and choosing the laser irradiation frequency as substantially 920±15 cm$^{-1}$.

4. A method according to claim 1, further including the steps of providing CDF$_3$ as the working molecule and choosing the laser irradiation frequency from a class consisting substantially of 1930±15 cm$^{-1}$, 1077±20 cm$^{-1}$, 687±5 cm$^{-1}$, 1200±10 cm$^{-1}$, 831±15 cm$^{-1}$ and 497±5 cm$^{-1}$.

5. A method according to claim 1, further including the step of providing an NH$_3$ laser for irradiating the molecules XYT and XYD.

6. A method according to claim 5, further including the step of providing CDCl$_3$ as the working molecule and choosing the laser irradiation frequency substantially as 12.08 μm.

7. A method according to claim 5, further including the step of providing CDF$_3$ as the working molecule and choosing the irradiation frequency substantially as 12.08 μm.

8. A method according to claim 1, further including the steps of providing CDCl$_3$ as the working molecule and choosing the laser irradiation frequency from a class consisting substantially of 1930±40 cm$^{-1}$, 635±10 cm$^{-1}$, 362±5 cm$^{-1}$, 840±15 cm$^{-1}$, 673±10 cm$^{-1}$ and 259±5 cm$^{-1}$.

9. A method according to claim 1, further including the steps of providing CDBr$_3$ as the working molecule and choosing the laser irradiation frequency from a class consisting substantially 1929±15 cm$^{-1}$, 506±5 cm$^{-1}$, 223±3 cm$^{-1}$, 594±5 cm$^{-1}$, 155±3 cm$^{-1}$ and 761±10 cm$^{-1}$.

10. A method according to claim 1, further including the step of providing a CO laser for irradiating the molecules XYT and XYD.

11. A method according to claim 1, further including the steps of:
    providing the molecules XYD and XYT at partial pressures up to about 0.5 atmosphere, and imiting the duration of the laser irradiation pulse to no more than 30 nanoseconds.

12. A method according to claim 11, further including the step of adding a buffer gas to allow operation at partial pressures of the working molecule up to 1 atmosphere.

13. A method for isotope separation of tritium-bearing molecules from heavy water reactor coolants in a molecular mixture, the method comprising the steps of:
providing an initial fluid containing an isotope mixture of deuterium-containing molecules $D_2O$ and tritium-containing molecules DTO;
catalytically reacting the initial fluid with deuterium-containing working molecules XYD, where the working molecule XYD is a doubly-halogenated or triply halogenated methane molecule, in an exchange reaction $DTO + XYD \rightarrow D_2O + XYT$ to obtain product molecules XYT;
irradiating the product molecules XYT and the working molecules XYD with a pulsed infrared laser, tuned to a frequency that is photoselectively absorbed by XYT but not by XYD, so that the XYT molecule absorbs one or more laser photons of frequency $\nu_1$ and is excited to a higher energy state according to the reaction $XYT + nh\nu_1 \rightarrow XYT^*$;
irradiating the molecule XYD and the excited molecule XYT* with a second pulsed infrared laser, tuned to a second frequency that is photoselectively absorbed by XYT* but not by XYD, so that the XYT* molecule absorbs a large number n of laser photons of frequency $\nu_2$ and dissociates according to the reacton $XYT^* + nh\nu_2 \rightarrow X + YT$; and
chemically separating the molecules YT from the other molecules in the molecular mixture.

14. A method for isotope separation of tritium-bearing molecules from light water reactor and fusion reactor coolants in a molecular mixture, the method comprising the steps of:
providing an initial fluid containing an isotope mixture of hydrogen-containing molecules $H_2O$ and tritium-containing molecules HTO;
catalytically reacting the initial fluid with hydrogen-containing working molecules XYH, where the working molecule XYH is a doubly-halogenated or triply halogenated methane molecule, in an exchange reaction $HTO + XYH \rightarrow H_2O + XYT$ to obtain product molecules XYT;
irradiating the molecules XYT and XYH with a pulsed infrared laser, tuned to a frequency that is photoselectively absorbed by XYT but not by XYH, so that the XYT molecule absorbs a large number $n (\geq 20)$ of laser photons of frequency $\nu$ and dissociates according to the reaction $XYT + nh\nu \rightarrow X + YT$; and
chemically separating the molecules YT from the other molecules in the molecular mixture.

15. A method according to claim 14, further including the step of providing a $CO_2$ laser for irradiating the molecules XYT and XYH.

16. A method according to claim 15, further including the steps of providing $CHF_3$ as the working molecule and choosing the laser irradiation frequency as substantially $1077 \pm 20$ cm$^{-1}$.

17. A method according to claim 14, further including the step of providing an $NH_3$ laser for irradiating the molecules XYT and XYH.

18. A method according to claim 17, further including the steps of providing $CHCl_3$ as the working molecule and choosing the laser irradiation frequency substantially as 12.08 $\mu$m.

19. A method according to claim 17, further including the steps of providing $CHF_3$ as the working molecule and choosing the laser irradiation frequency substantially as 12.08 $\mu$m.

20. A method according to claim 14, further including the step of providing a CO laser for irradiating the molecules XYT and XYH.

21. A method according to claim 14, further including the steps of:
providing the molecules XYH and XYT at partial pressures up to about 0.5 atmosphere, and
limiting the duration of the laser irradiation pulse to no more than 30 nanoseconds.

22. A method according to claim 21, further including the step of adding a buffer gas to allow further increase in partial pressures of the working molecules.

23. A method for isotope separation of tritium-bearing molecules from light water reactor and fusion reactor coolants in a molecular mixture, the method comprising the steps of:
providing an initial fluid containing an isotope mixture of hydrogen-containing molecules $H_2O$ and tritium-containing molecules HTO;
catalytically reacting the initial fluid with hydrogen-containing working molecules XYH, where the working molecule XYH is a doubly-halogenated or triply halogenated methane molecule, in an exchange reaction $HTO + XYH \rightarrow H_2O + XYT$ to obtain product molecules YXT;
irradiating the product molecules XYT and the working molecules XYH with a pulsed infrared laser, tuned to a frequency that is photoselectively absorbed by XYT but not XYH, so that the XYT molecule absorbs one or more laser photons of frequency $\nu_1$ and is excited to a higher energy state according to the reaction $XYT + nh\nu_1 \rightarrow XYT^*$;
irradiating the molecules XYH and the excited molecule XYT* with a second pulsed infrared laser, tuned to a second frequency that is photoselectively absorbed by XYT* but not by XYH, so that the XYT* molecule absorbs a large number n of laser photons of frequency $\nu_2$ and dissociates according to the reaction $XYT^* + nh\nu_2 \rightarrow X + YT$; and
chemically separating the molecules YT from the other molecules in the molecular mixture.

* * * * *